(12) United States Patent
Subramanian et al.

(10) Patent No.: US 9,965,318 B2
(45) Date of Patent: May 8, 2018

(54) CONCURRENT PRINCIPAL COMPONENT ANALYSIS COMPUTATION

(71) Applicant: Tata Consultancy Services Limited, Mumbai (IN)

(72) Inventors: Easwara Naga Subramanian, Hyderabad (IN); Amit Kalele, Pune (IN); Anubhav Jain, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 29 days.

(21) Appl. No.: 15/071,083

(22) Filed: Mar. 15, 2016

(65) Prior Publication Data

US 2016/0275909 A1    Sep. 22, 2016

(30) Foreign Application Priority Data

Mar. 16, 2015  (IN) .......................... 870/MUM/2015

(51) Int. Cl.
*G06F 15/80*    (2006.01)
*G06F 9/46*    (2006.01)

(52) U.S. Cl.
CPC ...................... *G06F 9/46* (2013.01)

(58) Field of Classification Search
CPC ........ G06F 17/16; G06F 9/5066; G06F 9/544; G06T 1/60; G06T 7/73
See application file for complete search history.

(56) References Cited

U.S. PATENT DOCUMENTS

| 7,885,454 | B1 | 2/2011 | Kass | |
| 2010/0185716 | A1* | 7/2010 | Nakamura | G06F 17/16 708/650 |
| 2012/0203515 | A1 | 8/2012 | Pita et al. | |
| 2014/0010460 | A1* | 1/2014 | Oka | G06K 9/481 382/197 |

OTHER PUBLICATIONS

"Super-Fast Parallel Eigenface Implementation on GPU for Face Recognition", Devani et al., 2014 International Conference on Parallel, Distributed and Grid Computing, IEEE.*

(Continued)

*Primary Examiner* — Hau H Nguyen
(74) *Attorney, Agent, or Firm* — Finnegan, Henderson, Farabow, Garrett & Dunner LLP

(57) ABSTRACT

The disclosure generally relates to principal component analysis (PCA) computation and, more particularly, to concurrent PCA computation. In one embodiment, a plurality of concurrent PCA requests are received by a server. An input matrix for each of the concurrent PCA requests is computed using a general purpose-graphical processing unit (GP-GPU) by the server. Further, tridiagnolization on the input matrix is performed on each of the concurrent PCA requests by a general purpose-graphical processing unit (GP-GPU) in the server to generate a tridiagonal matrix for each of the concurrent PCA requests. Furthermore, a plurality of eigen values and corresponding eigen vectors are computed for the tridiagonal matrix of each of the concurrent PCA requests by the server and subsequently back transformation of the eigen values and the eigen vectors is performed by the server for each of the concurrent PCA requests to obtain associated principal components.

19 Claims, 8 Drawing Sheets

(56) References Cited

OTHER PUBLICATIONS

"MR3-SMP: A symmetric tridiagonal eigensolver for multi-core architectures", Petschow et al., Parallel Computing vol. 37, Issue 12, Dec. 2011, pp. 795-805.*

Andrecut, M. (Dec. 2009). "Parallel GPU Implementation of Iterative PCA Algorithms," *Journal of Computational Biology*, 16(11): pp. 1-45.

Zheng, X. et al. (2012). "A high-performance computing toolset for relatedness and principal component analysis of SNP data," *Bioinformatics*, 28(24 2012): pp. 3326-3328.

* cited by examiner

CONCURRENT PRINCIPAL COMPONENT ANALYSIS COMPUTATION

CROSS REFERENCE TO RELATED APPLICATIONS AND PRIORITY

This U.S. patent application claims priority under 35 U.S.C. § 119 to: India Provisional Application No. 870/MUM/2015, filed on Mar. 16, 2015. The entire contents of the aforementioned application are incorporated herein by reference.

FIELD OF INVENTION

The present disclosure generally relates to concurrent principal component analysis (PCA) computation and, in particular, to a general purpose-graphical processing unit (GP-GPU) implementation of tridiagnalization for performing concurrent PCA computation.

BACKGROUND

Generally, principal component analysis (PCA) is an approach for dimensionality reduction of high dimensional data by extracting relevant components from the high dimensional data. The data with reduced dimensions may be easier for analysis. Typically, PCA has wide applications in various fields such as computer vision, neuroscience, social science, computational finance, etc. For example, in applications used in computational finance such as haircut computation, PCA computation operations may have to be performed frequently all throughout the day. Further, big investment banks have many client portfolios that mandate simultaneous PCA computation for all the client portfolios. The execution time for a single PCA computation increases with the size of the portfolio. However, if there are multiple client portfolios, several such PCA computations may have to be done concurrently.

The inventors here have recognized several technical problems with such conventional systems, as explained below. PCA computation require processing of input data in the form of matrices and may involve tridiagnalization of the input matrix. There are few conventional PCA based computing systems that perform sequential tridiagonalization methods, however, such system implementations are not sufficiently time effective in performing large scale data computations. Such computations are computationally expensive and take a long time for being handled by the central processing unit (CPU) of a computing system for handling PCA related requests.

SUMMARY

Embodiments of the present disclosure present technological improvements as solutions to one or more of the above-mentioned technical problems recognized by the inventors in conventional systems. For example, in one embodiment, a method for performing concurrent principal component analysis (PCA) computation is disclosed. In an embodiment, a plurality of concurrent PCA requests are received by a server from a multiple clients. Further, an input matrix for each of the plurality of concurrent PCA requests is computed by the server. Furthermore, tridiagnolization on the input matrix for each of the plurality of concurrent PCA requests is performed by a general purpose-graphical processing unit GP-GPU in the server to generate a tridiagonal matrix for each of the plurality of concurrent PCA requests; In addition, a plurality of eigen values and a plurality of corresponding eigen vectors for the tri-diagonal matrix of each of concurrent PCA requests are computed by the server. Moreover, back transformation of the eigen values and the eigen vectors is performed by the server for each of the plurality of concurrent PCA requests to obtain associated principal components. The back transformation is performed to obtain corresponding eigen values and eigen vectors of the input matrix. The principal components are further sent back to the client from the server.

In another aspect, a server for performing concurrent PCA computation is disclosed. In an embodiment, the system includes one or more memory storing instructions, one or more processors and a memory communicatively coupled to the processors. In an example implementation, one or more processor are configured by instruction to receive a plurality of concurrent PCA requests by a server, compute an input matrix for each of the plurality of concurrent PCA requests using a general purpose-graphical processing unit (GP-GPU) in the server. Further, a tridiagonal matrix for each of the RCA requests is received from the GP-GPU based on the input matrix. Furthermore, a plurality of eigen values and a plurality of corresponding eigen vectors for the tridiagonal matrix are computed for each of the plurality of concurrent RCA requests. In addition, back transformation of the eigen values and the eigen vectors of plurality of concurrent RCA requests is performed to obtain associated principle components, wherein the back transformation is performed to obtain corresponding eigen values and eigen vectors of the input matrix. Moreover, one or more general purpose-graphical processing unit (GP-GPU) is communicatively coupled to one or more memory, wherein at least one GP-GPU configured by the instructions to receive the input matrix from one or more processor. Further tridiagnolization is performed on the input matrix for each of the plurality of concurrent PCA requests to generate the tridiagonal matrix for each of the PCA requests. Furthermore, tridiagonal matrix for each of the PCA requests is sent to one or more processors.

In yet another embodiment, a computer program method for processing concurrent principal component analysis (PCA) computation is disclosed. The method comprises of receiving a plurality of concurrent PCA requests by a server and computing an input matrix for each of the plurality of concurrent PCA requests. Tridiagnolization is performed on the input matrix of each of the plurality of concurrent PCA requests, by a general purpose-graphical processing unit (GP-GPU) in the server to generate a tridiagonal matrix for each of the plurality of concurrent PCA requests; Further, a plurality of eigen values and a plurality of corresponding eigen vectors are computed for the tridiagonal matrix of each of the plurality of concurrent PCA requests by the server; Subsequently, back transformation of the eigen values and the eigen vectors, by the server, for each of the plurality of concurrent PCA requests is performed to obtain associated principal components, wherein the back transformation is performed to obtain corresponding eigen values and eigen vectors of the input matrix.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
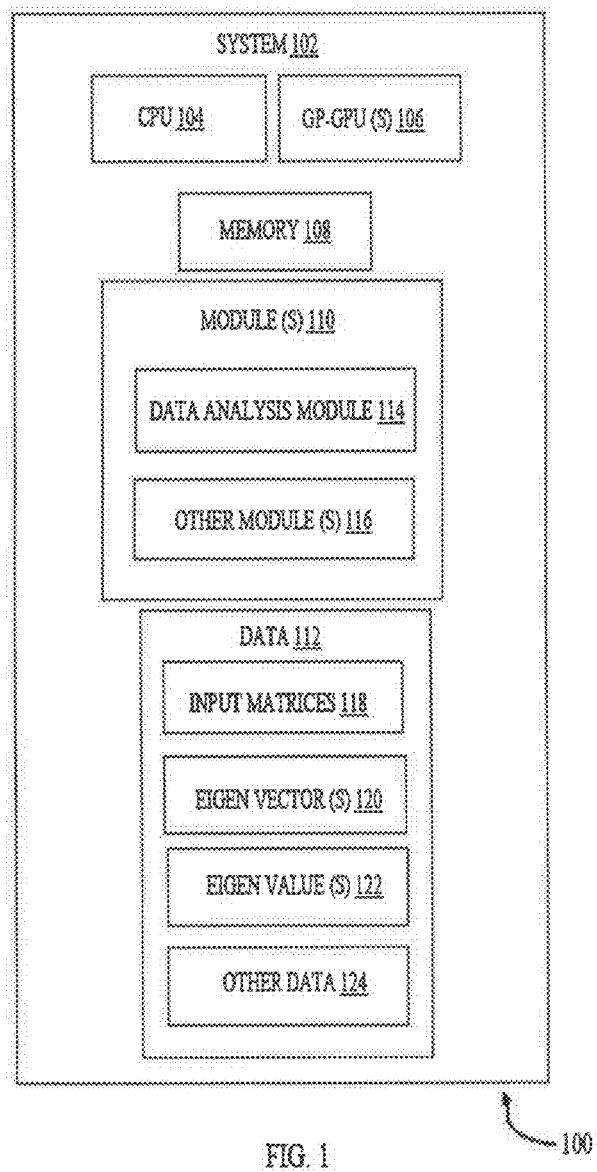
FIG. 1 illustrates a block diagram of a system for performing concurrent principal component analysis (PCA) computation using a general purpose-graphical processing unit (GP-GPU), according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The terms "transfer" and "transmit" are used interchangeably in the document. Further, "server", "system" and "host" are used interchangeably in the.

System and method for performing concurrent principal component analysis (PCA) computation using a general purpose processing unit such as a general purpose-graphical processing unit (GP-GPU) implementation are disclosed. The system can be implemented in a variety of computing devices. The computing devices that can implement the described system include, but are not limited to, desktop computers, laptops or other portable computers, multiprocessor systems, microprocessor based programmable consumer electronics, laptops, network computers, minicomputers, mainframe computers, and the like. Although the description herein is with reference to certain computing systems, the system may be implemented in other devices, albeit with a few variations, as will be understood by a person skilled in the art.

The manner in which the described system is implemented to enable concurrent principal component analysis computation has been explained in detail with respect to the following figure(s). While aspects of the described system can be implemented in any number of different computing systems, transmission environments, and/or configurations, the embodiments are described in the context of the following exemplary system.

The subject matter disclosed herein, in particular, relates to approaches for efficiently receiving and processing concurrent PCA requests. In one implementation, concurrent PCA requests are offloaded in the server to the GP-GPU. In another implementation, the system performs a full GP-GPU implementation of tridiagnalization of an input matrix. While being processed by the GP-GPU, the processing requires minimal interaction and transfers with the central processing unit (CPU) (also referred to as the host CPU and processor). In addition, the system disclosed herein processes concurrent PCA requests by using mull-stream computations of compute unified device architecture (CUDA®) paradigm of NVIDIA Corporation. A person skilled in the art can envision that the above mentioned tridiagnalization process can be performed in a single or multi-threaded process.

The subject matter disclosed herein relates to a system for computation of the concurrent PCA requests on large data in a GP-GPU enabled framework. In an embodiment, the subject matter disclosed herein provides a fast GP-GPU based Eigen solver to compute a partial eigen spectrum of an input matrix. The subject matter disclosed herein relates to a multi-stream based parallel implementation to perform concurrent execution of PCA requests. The subject matter disclosed herein relates to receiving one or more PCA requests from one or more clients. The subject matter disclosed herein provides a client-server framework to perform computation of the concurrent PCA requests for large input matrices. These large input matrices are typically real, symmetric and square matrices. The client-server framework uses multi-threaded and multi-stream technology to simultaneously process concurrent PCA requests. For example, the system disclosed herein creates a pool of 32 threads and streams for simultaneously processing multiple PCA requests. Hence, significant speed-up is achieved in processing a batch of concurrent PCA requests in comparison to a traditional CPU based serialized system. The system disclosed herein ports the compute intensive steps of PCA computation to the GP-GPU so that tridiagnalization is fully implemented by compute units of the GP-GPU in a parallel fashion. The system disclosed herein executes tridiagnalization routines that require minimal CPU to GP-GPU interaction, thereby saving time in the process of data computation.

In other words, the features that are achieved with the subject matter disclosed are that the server accepts multiple job requests from different clients even if all compute resources are already busy. In the case when all compute resources are busy, the server must continue to accept requests from clients and queue them appropriately. As the size of the input matrix in a PCA job request can vary largely between different client requests, the server adopts an intelligent scheduling mechanism to ensure full utilization of the HPC infrastructure. Small size problems require large throughput and larger problems require low latency.

The system disclosed herein accelerates computation of PCA requests of large input matrices by porting the tridiagnalization process part of the PCA computation to the GP-GPU. In an example, an input matrix is formed from correlation of historical prices of financial assets present in a client portfolio. The system determines a partial eigen spectrum containing leading eigen values and eigen vectors of the input matrix using the DSYEVR routine of linear algebra package (LAPACK). In general, the computational bottleneck in determining a partial eigen spectrum of a large input matrix is the tridiagnalization of the input matrix. Hence, the system performs tridiagnalization of the input matrix completely on the GP-GPU. In an example embodiment, the tridiagnalization technique implemented by the system is based on a DSYTRD routine of LAPACK and several CUDA® basic linear algebra subroutines (CuBLAS). Internally, the DSYEVR routine uses the DSYTRD routine of CLAPACK to perform tridiagnalization. The system ports the execution of DSYTRD from the CPU to the GP-GPU.

Consider an example where the GP-GPU receives multiple input matrices. The CPU computes eigen values and eigen vectors of the input matrices. The GP-GPU then converts each input matrix to a tridiagonal matrix so that the PCA computation of the input matrices can be speeded up. The CPU then computes eigen vectors and eigen values of the tridiagonal matrices. Finally, the CPU performs back transformation for relating the computed eigen vectors and eigen values of the tridiagonal matrices to the original input matrices, thereby speeding the PCA computation of the input matrices.

FIG. 1 illustrates a block diagram 100 of a system 102 for computing concurrent PCA requests using the GP-GPU implementation, according to an embodiment of the present subject matter. As exemplarily illustrated in FIG. 1, the system 102 comprises a CPU 104, single or multiple GP-GPU(s) 106, a memory 108, and multiple module(s) 110 comprising a data analysis module 114 and other module(s) 116. The system 102 processes data 112 comprising input matrices 118, eigen vectors 120, eigen values 122, and other data 124 comprising, for example, tridiagonal matrices, etc. In an embodiment, the data analysis module 114 performs, for example, input matrix computation, tridiagnalization of the input matrix 118, computation of eigen vectors 120 and eigen values 122, operations associated with the tridiagonaliz ng of the input matrices 118 such as parallel matrix-vector multiplication and matrix-matrix multiplication, etc.

As shown in FIG. 1, the system 102 includes a central processing unit (CPU) 104, a general purpose graphical processing unit (GPU-GPU) 106, a memory 108 and a data 112 communicatively coupled to each other. The memory 108 includes a data analysis module 114 that performs tridiagonlization of an input matrix and one or more other modules 116. Although FIG. 1 shows example components of the system 102, in other implementations, the system 102 may contain fewer components, additional components, different components, or differently arranged components than depicted in FIG. 1.

The CPU 104 and the memory 108 may be communicatively coupled by a system bus. The CPU 104 may include circuitry implementing, among others, audio and logic functions associated with the communication. The CPU 104 may include, among other things, a clock, an arithmetic logic unit (ALU) and logic gates configured to support operation of the CPU 104. The CPU 104 can be a single processing unit or a number of units, all of which include multiple computing units. The CPU 104 may be implemented as one or more microprocessors, microcomputers, microcontrollers, digital signal processors, central processing units, state machines, logic circuitries, and/or any devices that manipulate signals based on operational instructions. Among other capabilities, the CPU 104 is configured to fetch and execute computer-readable instructions and data stored in the memory 108.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The memory 108 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 108, may store any number of pieces of information, and data, used by the system 102 to evaluate the qualitative and quantitative performance rating. The memory 108 may be configured to store information, data, applications, instructions or the like for system 102 to carry out various functions in accordance with various example embodiments. Additionally or alternatively, the memory 108 may be configured to store instructions which when executed by the CPU 104 causes the system 100 to behave in a manner as described in various embodiments. The memory 104 includes the data analysis module 114 and other modules 116. The data analysis module 114 include routines, programs, objects, components, data structures, etc., which perform particular tasks or implement particular abstract data types.

The data analysis module 114 performs a full GP-GPU implementation of tridiagnalization of an input matrix 118, thereby requiring minimal interaction with the CPU 104 (also referred to as the host CPU). In addition, the data analysis module 114 performs concurrent PCA computations on large data in a GP-GPU enabled framework using multi-stream computations such as multiple CUDA® stream computations. In an embodiment, the data analysis module 114 provides a fast GP-GPU based Eigen solver to compute a partial Eigen spectrum of an input matrix 118. The data analysis module 114 executes a multi-stream based parallel implementation to perform concurrent execution of concurrent PCA requests. The data analysis module 114 ports the compute intensive steps of the PCA computation to the GP-GPU 106 so that tridiagnalization is fully implemented by compute units of the GP-GPU 106 in a parallel fashion. The data analysis module 114 executes one or more tridiagnalization routines that require minimal interaction between the CPU 104 and the GP-GPU 106.

Once the data analysis module 114 receives the input matrix 118, the data analysis module 114 determines a partial Eigen spectrum containing leading Eigen values 122 and Eigen vectors 120 of the input matrix 118 using multiple robust representation method. The data analysis module 114 completely ports the tridiagnalization process to the GP-GPU 106 with minimal interaction between the CPU and the GP-GPU. Porting the input matrix 118 to the GP-GPU 106 does not involve CPU interaction or involves minimal CPU interaction during the course of tridiagnalization. In an embodiment, the data analysis module 114 implements a multi-threaded and multi-stream framework to handle concurrent PCA requests. For example, the data analysis module 114 creates a pool of 32 threads and streams for simultaneously processing concurrent PCA requests. Hence, significant speed-up is achieved in processing concurrent PCA requests in comparison to a traditional CPU based serialized system. This is explained in detail in FIGS. 3 and 4.

The data analysis module 114 accelerates computation of principal components of large input matrices 118. Consider an example where the data analysis module 114 receives an input matrix 118 formed from historical prices of financial assets present in a client portfolio. The data analysis module 114 determines a partial Eigen spectrum containing leading Eigen values 122 and Eigen vectors 120 of the input matrix 118 using the DSYEVR routine of linear algebra package written in C language (CLAPACK). The data analysis module 114 performs tridiagnalization of the input matrix 118 completely on the GP-GPU 106. In an embodiment, the tridiagnalization technique implemented by the data analysis module 114 is based on the DSYTRD routine of LAPACK and uses several CuBLAS routines.

Consider another example where the data analysis module 114 receives multiple input matrices 118. The data analysis module 114 computes Eigen vectors 120 and Eigen values 122 of the input matrices 118. The data analysis module 114 converts each input matrix 118 to a tridiagonal matrix so that PCA computation speed of the input matrices 118 can be increased. Then the data analysis module 114 computes Eigen vectors 120 and Eigen values 122 of the tridiagonal matrices. Finally, the data analysis module 114 performs back transformation for relating the computed Eigen vectors 120 and Eigen values 122 of the tridiagonal matrices to the input matrices 118, thereby speeding the PCA computation of the input matrices 118. Even though it is mentioned that the GP-GPU 106 resides in the system 102, a person skilled in the art can envision that the GP-GPU 106 can reside in any other device connected to the system 102.

Figure 2:
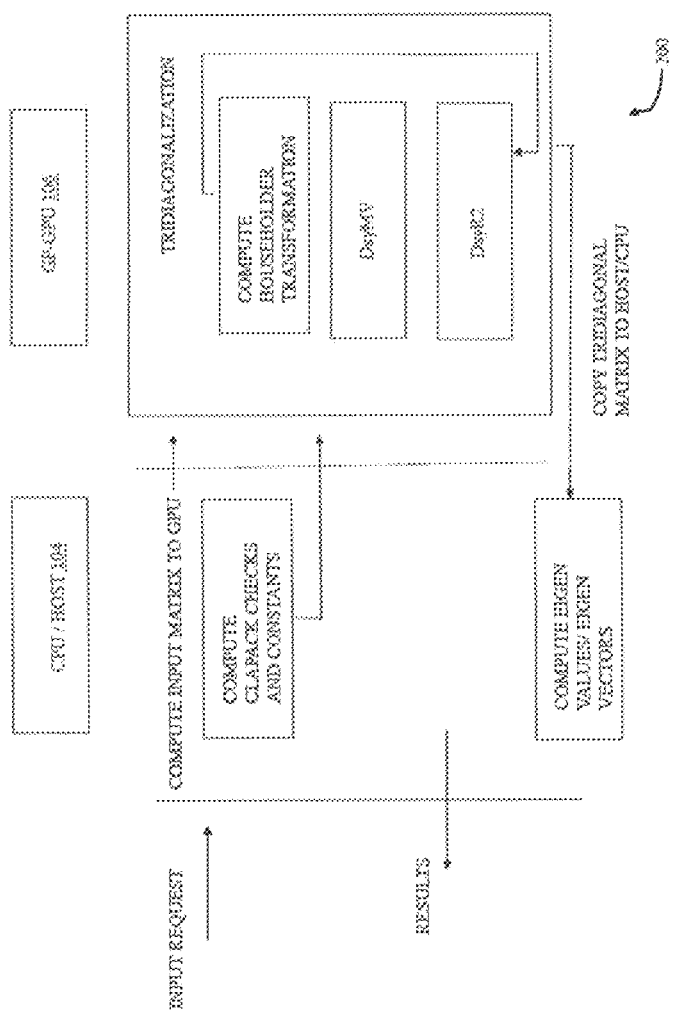
FIG. 2 illustrates a block diagram depicting components implementing principal component analysis as described in detail in conjunction with FIG. 1, according to some embodiments of the present disclosure.

FIG. 2 illustrates a block diagram 200 depicting components implementing PCA approaches as described in detail in conjunction with FIG. 1, according to an embodiment of the present subject matter. In an embodiment, the system 102 uses two algebraic linear libraries namely CLAPACK and cuBLAS. CLAPACK contains a C implementation of linear algebra routines, including eigen solvers and cuBLAS is an accelerated version of BLAS for GPU. In an example embodiment, the system 102 executes a CLAPACK's DSYEVR technique for computing eigen values and eigen vectors of input matrices. CLAPACK is used for the parts of technique that are scheduled to be performed in CPU and cuBLAS is used for the computations performed inside GPU. In an embodiment, the system 102 executes tridiagnolization of the input matrices using Householder transformation. Tridiagnolization technique involve several matrix vector multiplications, vector operations such as scaling, dot product and symmetric rank 2 updates. Disclosed below is a code snippet of the CLAPACK's DSYEVR technique executed by the CPU 102 for tridiagonalizing an input matrix using Householder transformation:

for j=0, n-1 do
$a_j = a_j - \Sigma_{i=s}^{j-1} (v_i^{(j+1)} u_i + u_i^{(j+1)} v_i)$
$a_j = -\text{sign}(a_j^{(j+1)}) * \text{cublasDnrm2}(a_j^{j+1:n})$
$u_j^{j+1} = \text{sqrt}(1 - a_j^{(j+1)}/a_j)$
$u_j^{(j+2:n)} = \text{cublasDscal}(-a_j^{(j+2:n)}, a_j u_j^{(j+1)})$
$y_j = \text{cublasDsymv}(A_j - u_{j-1} v_{j-1}^T - v_{j-1} u_{j-1}^T, u_j)$
$r_1 = \text{cublasDdot}(y_j^T \cdot u_j)$
$r_j = \text{cublasDaxpy}(r_1/2, u_j)$
$v_j = y_j - r_j$
// perform Symmetric Rank 2 update on sub matrix
$A^{(j:n, j:n)} = \text{cublasDsyr2}(A - uv^T - vu^T)^{(j:n, j:n)}$
end for Consider an example where the system 102 receives an input matrix A of size 4500. The system 102 executes the DSYEVR routine that reduces the input matrix to a tridiagonal matrix with a call to the DSYTRD routine. The DSYTRD routine executes DSYMV and DSYR2 library functions that together contribute to 99% of the time spent by the DSYTRD routine. The system 102 offloads DSYTRD routine functions from the CPU 104 to the GP-GPU 106. The data transfers between the GP-GPU 106 and the CPU 104 is kept at minimal while the GP-GPU 106 is performing certain operations. Once the input matrix A is offloaded to the GP-GPU 106 from the CPU 104, the GP-GPU 106 performs tridiagnalization without much data transfers with the CPU 104. The GP-GPU 106 uses multiple cuBLAS library functions comprising, for example, DNRM2, DSCAL, DSYMV, DDOT, DAXPY, and DSYR2 for performing matrix-matrix operations, matrix-vector operations, etc. In an embodiment, the system 102 may execute any other function implemented in any other environment for performing computational 375 operations. In an embodiment, the system 102 uses optimal cuBLAS performance libraries for BLAS routines. In an embodiment, the system 102 ports several other functions to the GP-GPU 106 to avoid frequent data transfers between the CPU and the device.

Figure 3:
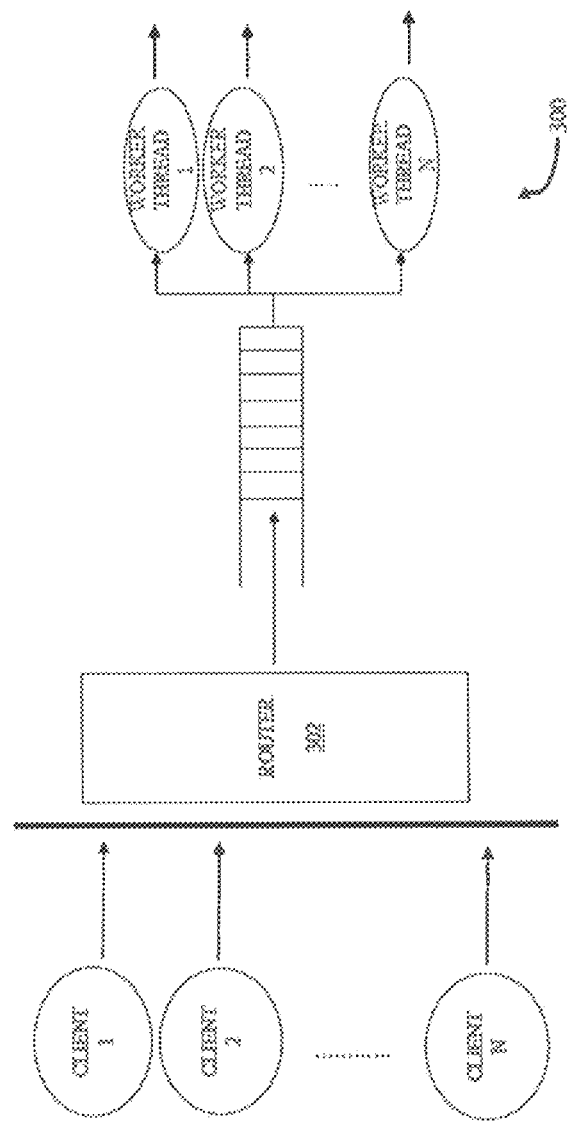
FIG. 3 illustrates a block diagram of scheduling PCA requests based on a queue for worker threads and a queue for PCA job requests, according to some embodiments of the present disclosure.

FIG. 3 illustrates a block diagram 300 of scheduling PCA request based on a 380 single queue for worker threads and a single queue for PCA job requests, according to an embodiment of the present subject matter. The PCA job requests are the PCA requests that are queued up to be processed by the worker threads. FIG. 3 more specifically illustrates a block diagram that includes multiple workers utilizing a shared resource such as GP-GPU using a single queue maintained for PCA job requests (also 385 referred as a job queue) and a single queue maintained for worker threads (also referred as worker queue). In an embodiment, each PCA request coming from a client are received by a router 302 in the server and the PCA requests are assigned to the worker threads. Further, each worker thread includes a busy flag indicating if the worker is busy or idle. The worker threads that are idle and not assigned to any job requests 390 are maintained in a single worker queue. The job requests that are to be processed and not assigned to any worker threads are maintained in a single job queue. The oldest job request from job queue is assigned to the oldest worker from worker queue.

Figure 4:
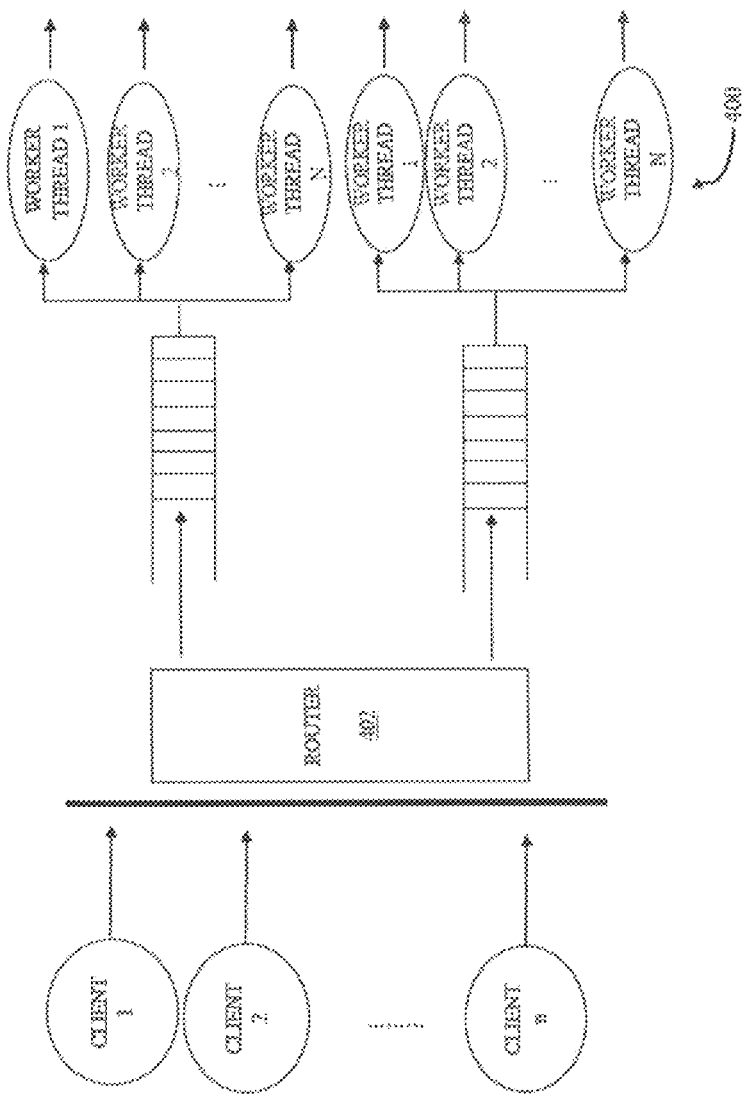
FIG. 4 illustrates a block diagram of scheduling concurrent PCA requests based on multiple queues for worker threads and multiple queues for PCA job requests, according to some embodiments of the present disclosure.

FIG. 4 illustrates a block diagram 400 of scheduling concurrent PCA requests based on multiple queues for worker threads and multiple queues for PCA job requests, 395 according to an embodiment of the present subject matter. The PCA job requests are the PCA requests that are queued up to be processed by the worker threads. More specifically, FIG. 4 illustrates the block diagram 400 that includes multiple workers utilizing a shared resource such as GP-GPU, multiple queues maintained for job requests and multiple queues maintained for worker threads. In an embodiment, the PCA requests are received by a router 402 in the server and the PCA requests are assigned to the worker queues based on the size of the PCA requests. For example, the size of the PCA request depends on a size of an input matrix. In an example implementation, two job queues are maintained depending on the size of the incoming PCA requests and two worker queues are maintained depending on the size of the job 405 process. In this example implementation, the worker threads are pre-assigned to one of the worker queues depending on the size of the job process. Similarly, PCA job requests are assigned to one of the two job queues depending on the size of the PCA requests. The job requests are handled by the worker threads from the respective worker queues.

Figure 5:
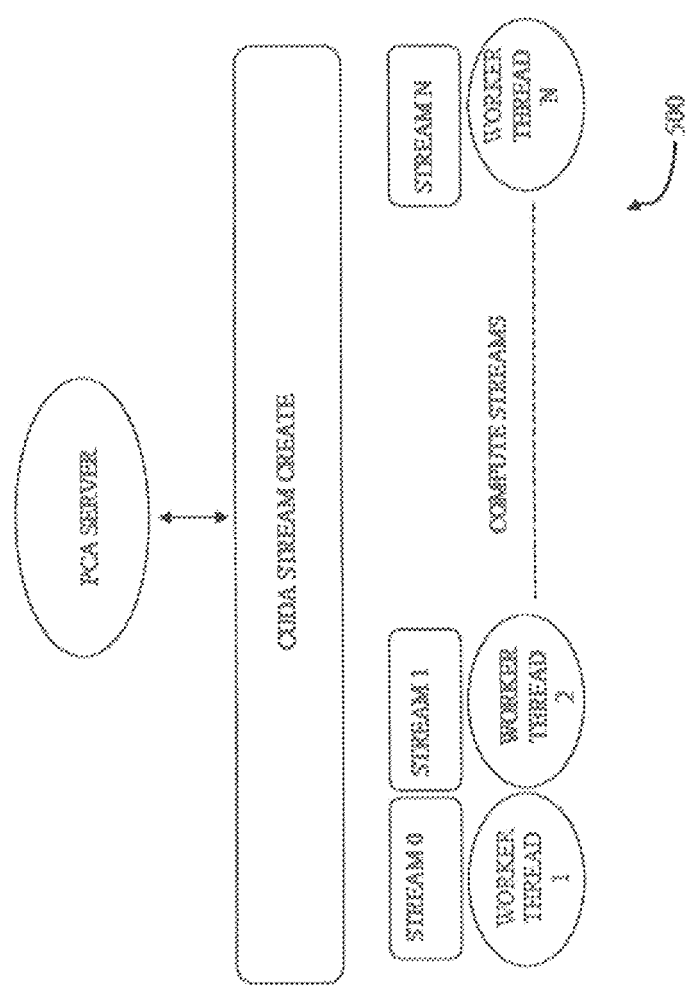
FIG. 5 illustrates a block diagram depicting components implementing a multi-threaded and multi-stream PCA requests simultaneously, as described in detail in conjunction with FIG. 1, according to some embodiments of the present disclosure.

FIG. 5 illustrates a block diagram 500 depicting components implementing a multi-threaded and multi-stream implementation of principal component analysis approaches for computing multiple principal component analysis requests simultaneously, as described in detail in conjunction with FIG. 1, according to an embodiment of the present subject matter. Each PCA request is processed in a separate thread. And, each thread is assigned to a separate stream, for example, a CUDA® stream. Hence, the multi-stream implementation of the system 102 provides performance optimization of PCA computation. As exemplarily illustrated in FIG. 5, the system 102 is implemented as a PCA server that implements, for example, Hyper-Q for performing concurrent PCA computation. In an embodiment, the PCA server creates a pool of 32 threads and streams. Hence, the PCA server can process 32 PCA requests simultaneously. The PCA server executes each PCA request in a new thread from the pool. The PCA server attaches each thread to a separate stream, for example, a CUDA® stream. Hence, the multi-threaded and multi-stream implementation of the system 102 disclosed herein facilitates better performance of the streams with Hyper-Q implemented on a Kepler GPU microarchitecture.

In an example, the multi-threaded and multi-stream implementation of the system 102 disclosed herein can process approximately 4000 PCA requests of varying matrix sizes in about 104 seconds on a Kepler K20 GPU using 32 streams simultaneously, in comparison to 12 minutes in a CPU based serialized system. The high speed up achieved is due to fast GP-GPU based tridiagnalization routine executed by the system 102 and Hyper-Q based mufti-threaded and multi-stream PCA implementation of the system 102. In addition, for matrix sizes of 4000*4000, a single GP-GPU based tridiagnalization is 11 times faster than a traditional serial method. Hence, the multi-threaded and multi-stream implementation of the system 102 can achieve over 11 times speed up for DSYTRD computation for large matrices. In addition in this example embodiment, the multi-threaded and multi-stream implementation of the system 102 disclosed herein can achieve about 5 times speed up for multiple jobs ranging from an input size of 3 to 6000.

Figure 6:
FIG. 6 illustrates a graph indicating comparison of DSYEVR performance associated with PCA computation by a central processing unit executing complex linear algebra package (CLAPACK) routines, a C2075 graphical processing unit computing processor, or a K20 graphical processing unit computing processor, according to some embodiments of the present disclosure.

FIG. 6 illustrates a graph 600 indicating comparison of DSYEVR performance associated with PCA computation between a CPU executing CLAPACK routines, a C2075 GPU computing processor, and a K20 GPU computing processor, according to an embodiment of the present subject matter. As illustrated in FIG. 6, the DSYEVR performance of the C2075 GPU computing processor and the K20 GPU computing processor is substantially better than the DSYEVR performance of the CPU executing CLAPACK routines.

Figure 7:
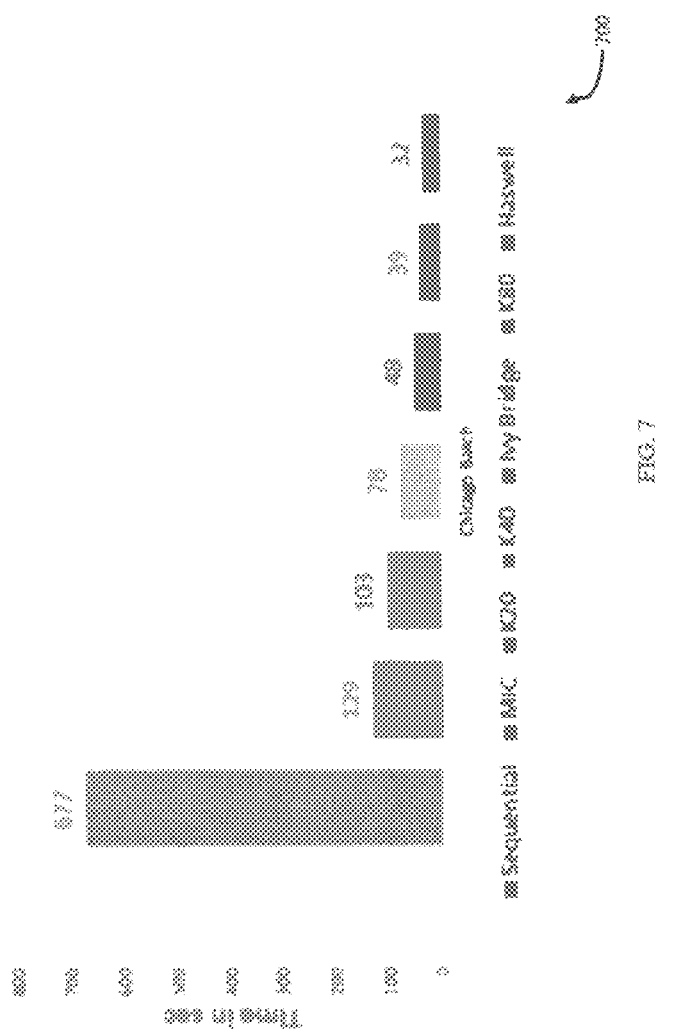
FIG. 7 illustrates a graph indicating comparison of DSYEVR performance associated with PCA computation of varying matrix sizes between a central processing unit executing CLAPACK routines, a C2075 graphical processing unit computing processor, or a K20 graphical processing unit computing processor, according to some embodiments of the present disclosure.

FIG. 7 illustrates a graph 700 indicating performance of processing of multiple PCA requests. The multiple PCA requests includes a large number of PCA requests that are smaller in size. In an example embodiment, an automated script is used to launch clients that trigger many concurrent PCA requests to a server. Further, scheduling of the PCA requests is done according to a single queue, multiple worker threads as explained in FIG. 3. In this example embodiment, the graph 700 illustrates the performance results for the multiple PCA requests on different Nvidia™ and Intel™ platforms. As shown in FIG. 7, system hosting K80 is efficient in timing among GPU based systems and Haswell (processor) is more efficient among Intel based systems. FIG. 7 also depicts that between K80 and Haswell, Haswell is more efficient in the time taken for processing the PCA requests.

Figure 8:
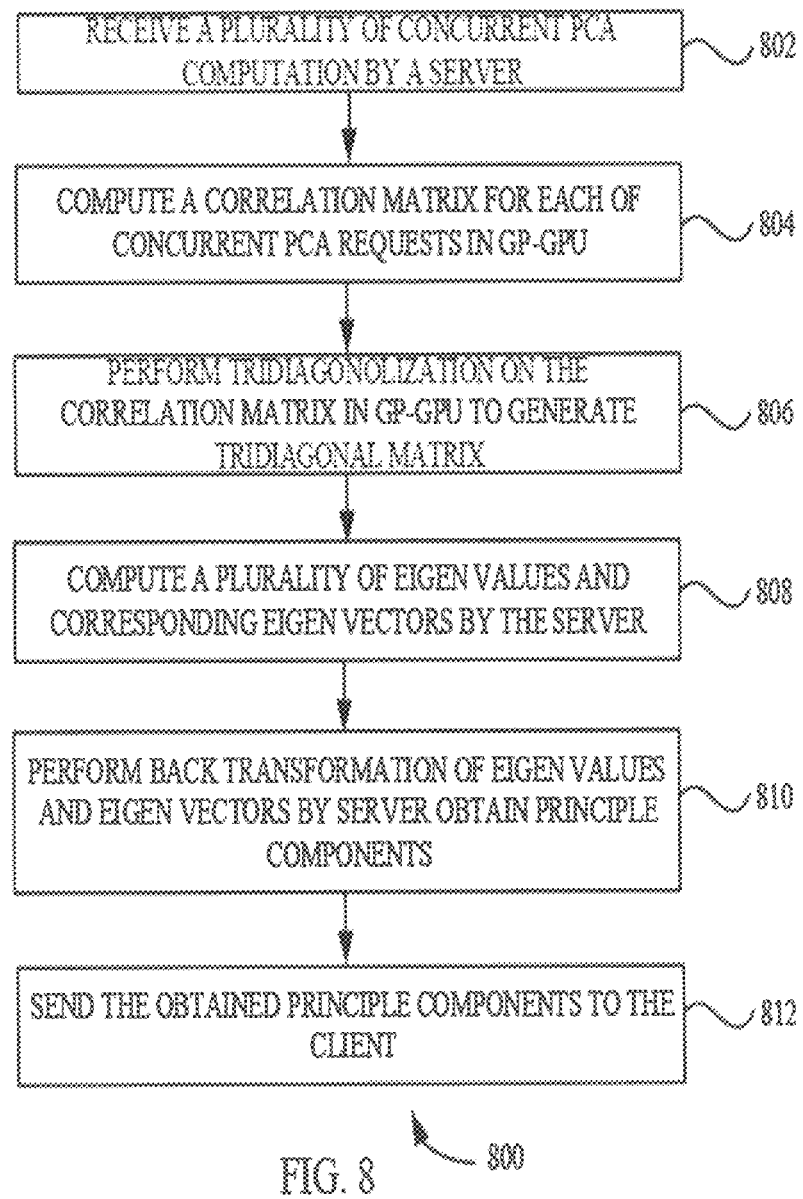
FIG. 8 is a flow chart illustrating a method for processing concurrent PCA requests using a GP-GPU, according to some embodiments of the present subject disclosure.

FIG. 8 is a flow chart illustrating a method for processing concurrent PCA requests using GP-GPU using a multi-threaded and multi stream framework, according to an embodiment of the present subject matter. At block 802, server receives a plurality of PCA requests from the server. At block 804, the PCA requests are assigned to worker threads that use CPU and compute input matrix for each PCA request. At block 806, tridiagnalization is performed on the input matrix in GP-GPU to generate tridiagonal matrix. At block 808, the tridiagonal matrix is sent back from GP-GPU to CPU in the server and a plurality of eigen values and the corresponding eigen vectors are computed in the server. Further at block 810, back transformation of eigen values and eigen vectors is performed by server to obtain principle components. At block 812, the obtained principle components are sent back to the client. The method is explained in the description mentioned above in FIGS. 1 to 4.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for processing concurrent principal component analysis (PCA) computation, comprising:
   receiving a plurality of concurrent PCA requests by a server;
   computing an input matrix for each of the plurality of concurrent PCA requests by the server;
   performing tridiagnolization on the input matrix of each of the plurality of concurrent PCA requests, by a general purpose-graphical processing unit (GP-GPU) in the server, to generate a tridiagonal matrix for each of the plurality of concurrent PCA requests;
   computing a plurality of eigen values and a plurality of corresponding eigen vectors for the tridiagonal matrix of each of the plurality of concurrent PCA requests by the server;
   performing back transformation of the eigen values and the eigen vectors, by the server, for each of the plurality of concurrent PCA requests to obtain associated principal components, wherein the back transformation is performed to obtain corresponding eigen values and eigen vectors of the input matrix;
   and
   implementing a multi-threaded and multi-stream framework to handle the plurality of concurrent PCA requests.

2. The method of claim 1, further comprising:
   assigning the received plurality of concurrent PCA requests to multiple threads utilizing shared resources of the GP-GPU in the server based on availability of the multiple threads.

3. The method of claim 2, wherein assigning the received plurality of concurrent PCA requests to the multiple threads utilizing shared resources of the GP-GPU in the server, comprises:
   assigning each of the plurality of concurrent PCA requests to an available thread in the multiple threads and queuing unassigned PCA requests in a job queue, wherein the available thread in the multiple threads is queued in a worker queue.

4. The method of claim 3, further comprising:
   assigning a first unassigned PCA request in the job queue to a first thread in the worker queue.

5. The method of claim 2, further comprising:
   queuing the received plurality of concurrent PCA requests in multiple job queues based on a size of corresponding PCA request; and
   queuing the multiple threads in multiple worker queues based on the size of the job process.

6. The method of claim 5, wherein assigning the received plurality of concurrent PCA requests to multiple threads, comprises:
   assigning a first thread in the worker queue to a first PCA request from the corresponding job queue based on the size of the PCA request and job process.

7. The method of claim 1, wherein computing the input matrix for each of the plurality of concurrent PCA requests using the GP-GPU in the server comprises;
   receiving data associated with a PCA request; and
   computing an input matrix for the PCA request based on the received data using the GP-GPU in the server.

8. The method of claim 1, wherein preforming tridiagnolization on the input matrix of each of the plurality of concurrent PCA requests comprises multiple matrix vector multiplications and multiple vector operations.

9. The method of claim 1, wherein the tridiagonal matrix is a matrix having non zero elements in a main diagonal of the matrix, a sub diagonal and a super diagonal of the matrix.

10. A system comprising:
    at least one memory storing instructions;
    at least one processor communicatively coupled to the at least one memory, wherein the at least one processor configured by the instructions to:
    receive a plurality of concurrent PCA requests;
    compute an input matrix for each of the plurality of concurrent PCA requests;
    receive a tridiagonal matrix for each of the PCA requests based on the input matrix;
    compute a plurality of eigen values and a plurality of corresponding eigen vectors for the tridiagonal matrix of each of the plurality of concurrent PCA requests; and
    perform back transformation of the eigen values and the eigen vectors for each of the plurality of concurrent PCA requests to obtain associated principal components, wherein the back transformation is performed to obtain corresponding eigen values and eigen vectors of the input matrix
    at least one general purpose-graphical processing unit (GP-GPU) communicatively coupled to the at least one memory, wherein the at least one GP-GPU configured by the instructions to:
    receive the input matrix from the at least one processor;
    perform tridiagnolization on the input matrix of each of the plurality of concurrent PCA requests to generate the tridiagonal matrix for each of the PCA requests;
    send the tridiagonal matrix for each of the PCA requests to the at least one processor;
    and
    implement a multi-threaded and multi-stream framework to handle the plurality of concurrent PCA requests.

11. The system of claim 10, wherein the at least one processor is configured by the instructions to: assign the received plurality of concurrent PCA requests to multiple threads utilizing shared resources of the GP-GPU in the server based on availability of the multiple threads.

12. The system of claim 11, wherein the at least one processor is configured by the instructions to:
    assign each of the plurality of concurrent PCA requests to an available thread in the multiple threads and queuing unassigned PCA requests in a job queue, wherein the available thread in the multiple threads queued in a worker queue.

13. The system of claim 12, wherein said at least one processor is configured by the instructions to:
    assign a first unassigned PCA request in the job queue to a first thread in the worker queue.

14. The system of claim 11, wherein said at least one processor is configured by the instructions to:

queue the received plurality of concurrent PCA requests in multiple job queues based on a size of corresponding PCA request; and queue the multiple threads in multiple worker queues based on the size of the job process.

15. The system of claim 14, wherein said at least one processor is configured by the instructions to:

assign a first thread in the worker queue is assigned to a first PCA request from the corresponding job queue received by the server based on the size of the PCA request and job process.

16. The system of claim 10, wherein said at least one processor is configured by the instructions to: compute an input matrix for each of the plurality of concurrent PCA requests using a (GP-GPU) in the server comprises;

receive data associated with a PCA request; and compute an input matrix for the PCA request based on the received data using the GP-GPU in the server.

17. The system of claim 10, wherein said at least one processor s configured by the instructions to preform tridiagnolization on the input matrix of each of the plurality of concurrent PCA request comprises a multiple matrix vector multiplications and a multiple vector operations.

18. The system of claim 10, wherein said at least one processor is configured by the instructions to generate the tridiagonal matrix:

a matrix having non zero elements in the main diagonal of the matrix, the sub diagonal and the super diagonal of the matrix.

19. A computer program method for processing concurrent principal component analysis (PCA) computation, said method comprising:

receiving a plurality of concurrent PCA requests by a server;

computing an input matrix for each of the plurality of concurrent PCA requests by the server;

performing tridiagnolization on the input matrix of each of the plurality of concurrent PCA requests, by a general purpose-graphical processing unit (GP-GPU) in the server, to generate a tridiagonal matrix for each of the plurality of concurrent PCA requests;

computing a plurality of eigen values and a plurality of corresponding eigen vectors for the tridiagonal matrix of each of the plurality of concurrent PCA requests by the server;

performing back transformation of the eigen values and the eigen vectors, by the server, for each of the plurality of concurrent PCA requests to obtain associated principal components, wherein the back transformation is performed to obtain corresponding eigen values and eigen vectors of the input matrix;

and implementing a multi-threaded and multi-stream framework to handle the plurality of concurrent PCA requests.

* * * * *